(12) United States Patent
Piccinini et al.

(10) Patent No.: US 11,244,069 B2
(45) Date of Patent: Feb. 8, 2022

(54) CONTROLLING COMBINATION OF INFORMATION SUBMITTED TO COMPUTING SYSTEMS

(71) Applicant: International Business Machines Corporation, Armonk, NY (US)

(72) Inventors: Sandro Piccinini, Rome (IT); Antonio Bagarolo, Marcianise (IT); Maximiliano Cammisa, Rome (IT); Marco Imperia, Rome (IT); Pasquale Maria Mascolo Montenero, Barletta (IT); Paolo Ottaviano, Rome (IT)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 16/551,271

(22) Filed: Aug. 26, 2019

(65) Prior Publication Data

US 2021/0064777 A1 Mar. 4, 2021

(51) Int. Cl.
*G06F 21/62* (2013.01)

(52) U.S. Cl.
CPC .............................. *G06F 21/6245* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 7,827,234 B2 | 11/2010 | Eisenberger | |
| 9,977,920 B2* | 5/2018 | Danielson | G06F 16/9535 |
| 10,970,414 B1* | 4/2021 | Lesner | G06F 40/242 |
| 2007/0088635 A1* | 4/2007 | King | G06Q 10/00 |
| | | | 705/30 |
| 2011/0126290 A1* | 5/2011 | Krishnamurthy | G06F 21/6263 |
| | | | 726/26 |
| 2012/0331567 A1* | 12/2012 | Shelton | G06Q 20/102 |
| | | | 726/28 |
| 2015/0161210 A1* | 6/2015 | Cook | G06F 21/6245 |
| | | | 707/600 |
| 2016/0315894 A1* | 10/2016 | Della Corte | H04L 51/14 |
| 2017/0083719 A1* | 3/2017 | Scaiano | G06F 16/903 |
| 2017/0177907 A1* | 6/2017 | Scaiano | G06F 21/6254 |
| 2017/0220818 A1 | 8/2017 | Nagasundaram | |
| 2018/0046753 A1 | 2/2018 | Shelton | |
| 2018/0075138 A1* | 3/2018 | Perram | G06F 16/93 |
| 2018/0129822 A1* | 5/2018 | Martinez | G06F 21/6227 |
| 2019/0156053 A1* | 5/2019 | Vogel | G06F 21/6245 |
| 2019/0197217 A1* | 6/2019 | Donovan | G06F 11/3476 |

(Continued)

FOREIGN PATENT DOCUMENTS

| | | |
|---|---|---|
| CN | 112433985 A | 3/2021 |
| WO | 2016063092 A1 | 4/2016 |
| WO | 2017199235 A1 | 11/2017 |

*Primary Examiner* — Harris C Wang
(74) *Attorney, Agent, or Firm* — Michael A. Petrocelli

(57) ABSTRACT

A method and system for controlling distribution of information items of a subject is proposed. The method and system comprises verifying compliance of a combination of new information items (to be received by a target computing system) and available information items (already available to the target computing system) with one or more sharing rules; a receipt of the new information items by the target computing system is controlled according to a result of this verification.

15 Claims, 8 Drawing Sheets

(56) References Cited

U.S. PATENT DOCUMENTS

| | | | |
|---|---|---|---|
| 2019/0213332 A1* | 7/2019 | McCoy | G06F 21/577 |
| 2020/0250139 A1* | 8/2020 | Muffat | G06F 16/182 |
| 2020/0380160 A1* | 12/2020 | Kraus | G06F 21/604 |
| 2021/0064777 A1* | 3/2021 | Piccinini | G06F 21/6245 |
| 2021/0117481 A1* | 4/2021 | Tortosa | H04L 67/10 |
| 2021/0141928 A1* | 5/2021 | Singh | G06Q 10/103 |
| 2021/0311917 A1* | 10/2021 | Laskawiec | G06F 16/215 |

\* cited by examiner

CONTROLLING COMBINATION OF INFORMATION SUBMITTED TO COMPUTING SYSTEMS

BACKGROUND

The present disclosure relates to the information technology field. More specifically, this disclosure relates to the control of information in computing systems.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Control of information (stored in computing systems) is a key issue in several contexts. Particularly, whenever the information is particularly relevant for corresponding subjects, it is important to control its distribution to third parties. A typical example is personal information, i.e., information relating to identifiable persons. Indeed, the distribution of personal information to third parties may involve threats to a privacy of the corresponding persons; for example, the personal information may be used for purposes that are annoying (for example, spamming) or even dangerous (for example, stalking).

Therefore, most countries have privacy laws which regulate protection of personal information; for example, in the European Union this is prescribed by the General Data Protection Regulation (GDPR). As a general rule, the privacy laws provide any person the right to control how and to what extent the corresponding personal information is used. For example, this requires a consent to be explicitly given by the person to authorize every use of the personal information by third parties; particularly, a specific consent is necessary to authorize a third party (to which the personal information has been submitted by the person) to share the personal information with other third parties.

Very often, the persons submit their personal information to a high number of third parties. This is especially true in the Internet. Indeed, nowadays most persons use the Internet to perform many activities routinely (for example, to buy goods, to exploit functionalities, to find information and so on). For this purpose, the persons continually submit personal information to corresponding service providers, for example, when a registration thereto is required.

Moreover, it is common for the persons to authorize the third parties to share the personal information submitted thereto with other third parties. Particularly, this is often due to the fact that, especially in the Internet, most persons accept the privacy terms almost automatically, without really paying attention to the authorizations that are granted. Indeed, the acceptance of the privacy terms is required so often that generally the persons do not read them, and let alone carefully (since the operation is quite annoying); moreover, when the privacy terms are accepted on-line (as in the Internet), it hardly gives the awareness of a legally binding action.

This results in a massive dissemination of the personal information. Particularly, the inventors have realized that the sharing of the personal information among the third parties may bring about unexpected, and generally undesired, effects. This may happen even when the use of the corresponding personal information by the different third parties is completely acceptable by the persons. Indeed, different pieces of personal information of a person may be submitted to the third parties because their use by each of them does not pose any problem. However, because of the sharing of the personal information among the third parties, each third party may also receive other pieces of personal information of the same person from other third parties. As a result, it is possible that a third party gets access to a complex of personal information which is unacceptable for the person.

Indeed, specific pieces of personal information that are not critical per se, may become so when combined to each other. For example, a person submits his/her name to a first third party and his/her town to a second third party; generally, this does not pose any problem, since the name alone and the town alone do not allow identifying the person. However, the personal information may be shared between the two third parties, for example, because the first one has been authorized to do so. In this case, the second third party may receive the name of the person from the first third party. As a result, the second third party gets access to both the town (directly from the person) and the name (indirectly from the first third party) of the person. This may instead be dangerous, because now the personal information (name and town) allows identifying the person.

All of the above is exacerbated by the fact that very often the persons authorize the third parties to share the personal information submitted thereto with other third parties which are simply indicated as such (and not identified individually). Therefore, it is very difficult, if not impossible, for the persons to envisage possible problems which might be caused by the sharing of the information.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling possible combinations of the information.

Particularly, an embodiment provides a method for controlling distribution of information items of a subject. The method comprises verifying compliance of a combination of new information items (to be received by a target computing system) and available information items (already available to the target computing system) with one or more sharing rules; a receipt of the new information items by the target computing system is controlled according to a result of this verification.

A further aspect provides a computer program for implementing the method.

A further aspect provides a corresponding computer program product.

A further aspect provides a corresponding computing system.

In one aspect according to an embodiment of the invention, a method for controlling distribution of a plurality of information items of a subject includes receiving, by a target computing system, an indication of new one or more of the information items to be submitted to a target entity associated with the target computing system. The method includes receiving, by the target computing system, one or more sharing rules of the subject, the sharing rules being based on one or more combinations of the information items. The method includes retrieving, by the target computing system, an indication of any available ones of the information items being available to the target computing system. The method includes verifying, by the target computing system, a compliance of a combination of the new information items and the available information items with the sharing rules, and controlling, by the target computing system, a receipt of the new information items according to a result of said verifying the compliance.

In another aspect according to an embodiment of the invention, a computer program product for controlling distribution of a plurality of information items of a subject, comprises a computer readable storage medium having program instructions embodied therewith. The program instructions are readable by a computing system to cause the computing system to perform a method comprising: receiving an indication of new one or more of the information items to be submitted to a target entity associated with the computing system; receiving one or more sharing rules of the subject, the sharing rules being based on one or more combinations of the information items; retrieving an indication of any available ones of the information items being available to the computing system; verifying a compliance of a combination of the new information items and the available information items with the sharing rules; and controlling a receipt of the new information items according to a result of said verifying the compliance.

In another aspect according to an embodiment of the invention, a computing system for controlling distribution of a plurality of information items of a subject, includes a circuitry for receiving an indication of new one or more of the information items to be submitted to a target entity associated with the computing system. The system includes a circuitry for receiving one or more sharing rules of the subject, where the sharing rules are based on one or more combinations of the information items. A circuitry for retrieving an indication of any available ones of the information items is available to the computing system. The system includes a circuitry for verifying a compliance of a combination of the new information items and the available information items with the sharing rules. The system includes a circuitry for controlling a receipt of the new information items according to a result of said verifying the compliance.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

DETAILED DESCRIPTION

With reference in particular to FIG. 1A-FIG. 1D, an example is shown of application of the solution according to an embodiment of the present disclosure.

Figure 1A:
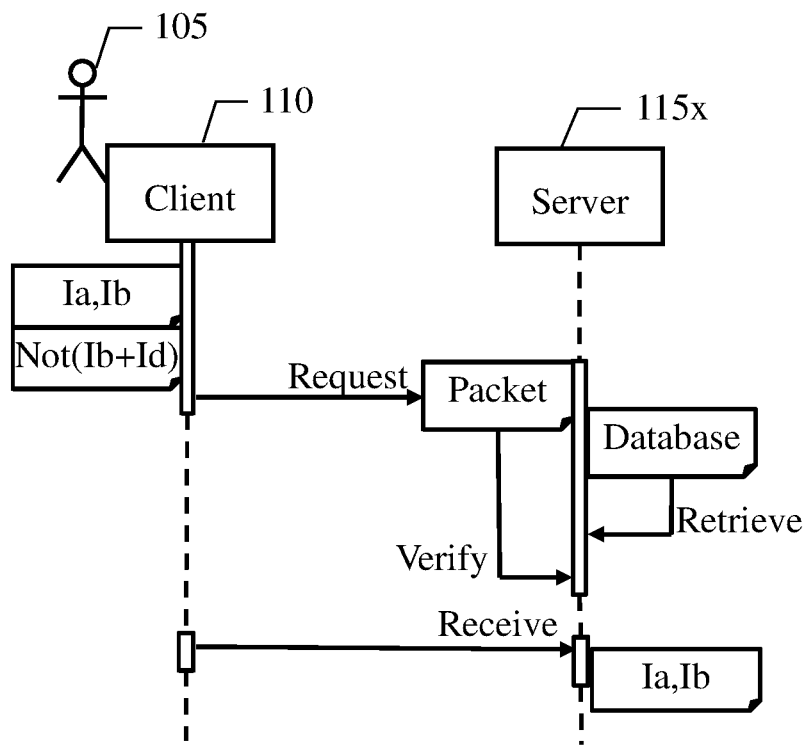
FIGS. 1A, 1B, 1C, and 1D show an example of application of the solution according to an embodiment of the present disclosure.

Starting from FIG. 1A, a user (i.e., a person) 105 uses a client computing system, or simply client 110 to access a server computing system, or simply server 115$x$ offering a corresponding service, for example, in the Internet. The user 105 may be required to submit personal information to the server 115$x$ for exploiting the service, at the same time authorizing a third party associated with the server 115$x$ to use the personal information. This authorization is granted by the user 105 accepting corresponding privacy terms (for example, by ticking options in a web page); in this phase, the user 105 may also authorize the third party to share the personal information with other third parties.

In the solution according to an embodiment of the present disclosure, the user 105 creates one or more sharing rules for his/her personal information. The sharing rules are based on one or more combinations of information items (defining corresponding pieces of the personal information); for example, each sharing rule indicates that two or more information items may not be made available together to any third party, i.e., their combination is not allowed. As soon as the user 105 asks the client 110 to submit one or more (new) information items to the server 115$x$, a corresponding verification packet is transmitted to the server 115$x$. The verification packet comprises an indication of the new information items (such as their hash values); moreover, the verification packet comprises one or more sharing rules (such as the ones relating to the new information items). For example, the verification packet indicates that new information items Ia and Ib are to be submitted to the server 115$x$, and it comprises a sharing rule indicating that the combination of information items Ib and Id is not allowed (NOT (Ib+Id)). When the verification packet is received by the server 115$x$, an indication of any (available) information items which are already available to the server 115$x$ is retrieved (for example, from a corresponding database). A compliance of a combination of the new/available information items with the sharing rules is verified. A receipt of the new information item by the server 115$x$ is then controlled according to a result of this compliance verification. For example, assuming that the information item Id of the user 105 is not available to the server 115$x$, the result of the compliance verification is positive and accordingly the server 115$x$ is allowed to receive the new information items Ia and Ib (which are stored therein) from the client 110 (for example, by returning a corresponding acceptance thereto).

Figure 1B:
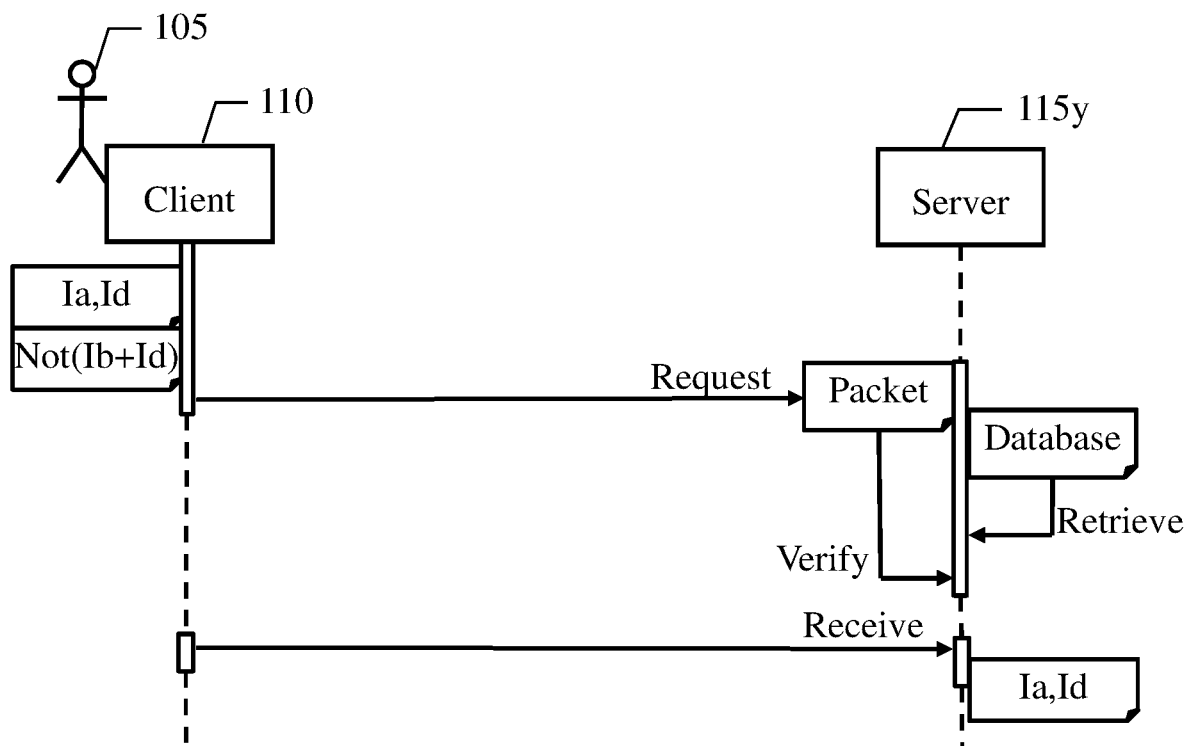

Moving to FIG. 1B, the user 105 further uses the client 110 to access another server computing system, or simply servers 115$y$ offering another corresponding service. In this case as well, the user 105 may be required to submit personal information to the server 115$y$ for exploiting the service, at the same time authorizing a third party associated with the server 115y to use the personal information (by accepting corresponding privacy terms). As above, as soon as the user 105 asks the client 110 to submit one or more (new) information items to the server 115y, a corresponding verification packet is transmitted to the server 115y. For example, the verification packet indicates that new information items Ia and Id are to be submitted to the server 115y, and it comprises the same sharing rule indicating that the combination of the information items Ib and Id is not allowed. When the verification packet is received by the server 115y, an indication of any available information items is retrieved and a compliance of a combination of the new/available information items with the sharing rules is verified for controlling a receipt of the new information item by the server 115y accordingly. For example, assuming that the information item Ib of the user 105 is not available to the server 115y, the result of the compliance verification is positive and the server 115y is allowed to receive the new information items Ia and Id (which are stored therein) from the client 110.

Figure 1C:
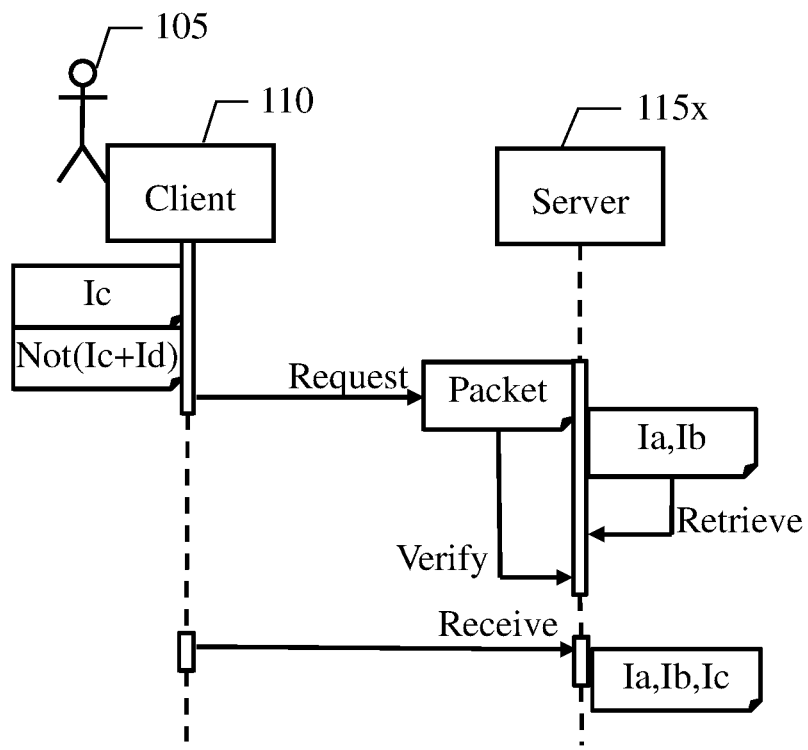

Moving to FIG. 1C, the user 105 may be required to submit further personal information to the server 115x for exploiting the service, at the same time authorizing the third party associated with the server 115x to use and share the personal information (by accepting corresponding privacy terms). As above, as soon as the user 105 asks the client 110 to submit one or more (new) information items to the server 115x, a corresponding verification packet is transmitted to the server 115x. For example, the verification packet indicates that a new information items Ic is to be submitted to the server 115x, and it comprises a sharing rule indicating that a combination of the information items Ic and Id is not allowed (NOT(Ic+Id)). When the verification packet is received by the server 115x, an indication of the available information items is retrieved; in this case, the available information items comprise the information items Ia and Ib which have been received previously from the client 110. A compliance of a combination of the new/available information items with the sharing rules is then verified. In this case as well, the result of the compliance verification is positive and accordingly the server 115x is allowed to receive the new information item Ic (which is stored therein) from the client 110.

Figure 1D:
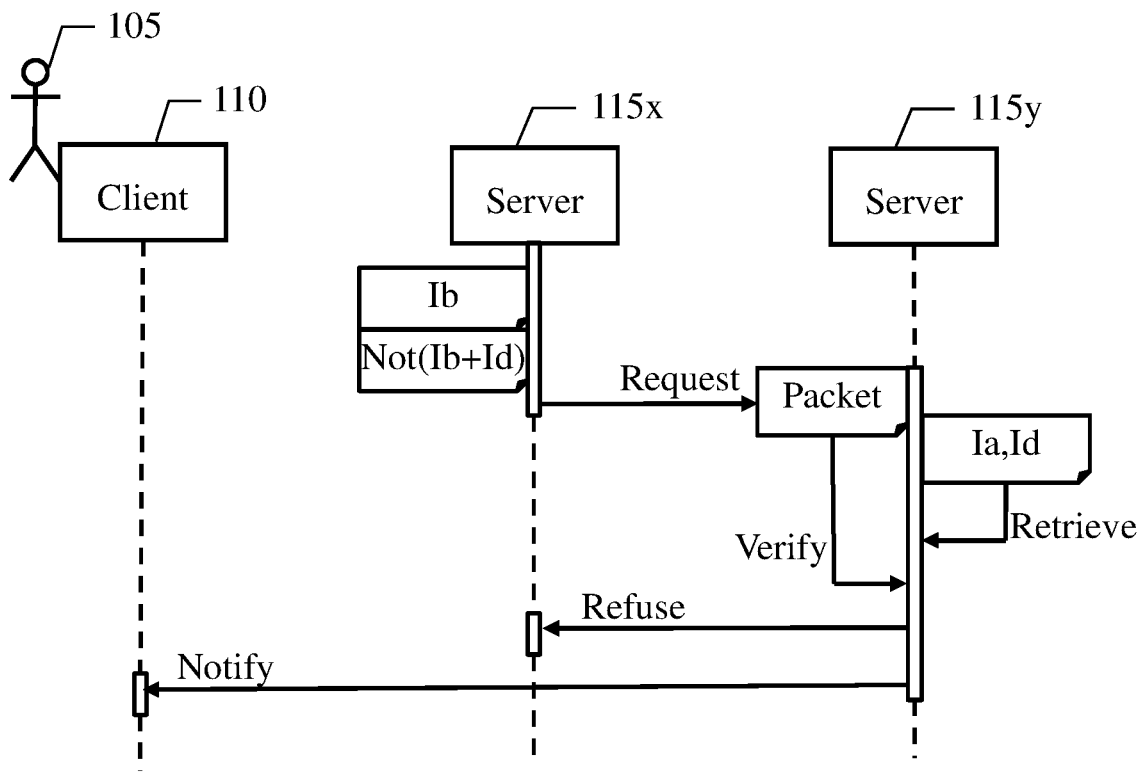

Moving to FIG. 1D, later on the server 115x may need to submit the information item Ib to the server 115y (being previously authorized to do so by the user 105). As above, a corresponding verification packet is transmitted by the server 115x to the server 115y. The verification packet indicates that the (new) information item Ib is to be submitted to the server 115y, and it comprises the corresponding sharing rule indicating that the combination of the information items Ib and Id is not allowed. When the verification packet is received by the server 115y, an indication of the available information items is retrieved; in this case, the available information items comprise the information items Ia and Id which have been received previously from the client 110. A compliance of a combination of the new/available information items with the sharing rules is then verified. Therefore, a result of the compliance verification is now negative, since the combination of the new information item Ib and the available information item Id is not allowed. In this case, the server 115y is prevented from receiving the new information item Ib from the server 115x (for example, by returning a corresponding refusal to the server 115x). Moreover, a corresponding notification (of the refusal of the receipt of the new information item Ib by the server 115y because of the availability of the information item Id on it) is transmitted to the client 110, so as to inform the user 105 accordingly.

For example, a user does not want to be identified by any third party via his/her name and town. For this purpose, the user creates a sharing rule indicating that the combination of name and town is not allowed. The user may then submit the name to a review web site (for posting reviews about products/services tagged with it). Moreover, the user may submit the town to a market-research web site (for participating to a survey based thereon). In both cases, the submission of the different pieces of information (name and town) to the corresponding third parties (review company and market-research company, respectively) is compliant with the sharing rule (since the use of the name and of the town individually does not pose any problem). However, even if the user has authorized any of the third parties to share the corresponding information items, none of them may get access to both of them. For example, if the review web site tries to submit the name to the market-research web site, the result of the corresponding compliance verification is negative. Therefore, the market-research web site is prevented from receiving the name (thereby avoiding its combination with the town which is already available to it).

The above-described solution significantly improves the control of the personal information, and especially its distribution to third parties.

Particularly, in this way it is possible to avoid, or at least substantially reduce, any unexpected (and undesired) effect resulting from the sharing of the personal information among the third parties (to which the personal information has been submitted by the user). More specifically, the proposed solution prevents third parties from getting access to any complex of personal information which is unacceptable for the user; this result may be achieved even if the complex of personal information results from the combination of specific pieces of personal information that are not critical per se, and then may have been submitted individually by the user to different third parties.

The above-described solution is of general applicability, since it does not require a knowledge of the third parties which may share the personal information. Therefore, the same solution is particularly advantageous when the user authorizes the third parties to share the personal information submitted thereto with other third parties which are simply indicated as such (and not identified individually).

Figure 2:
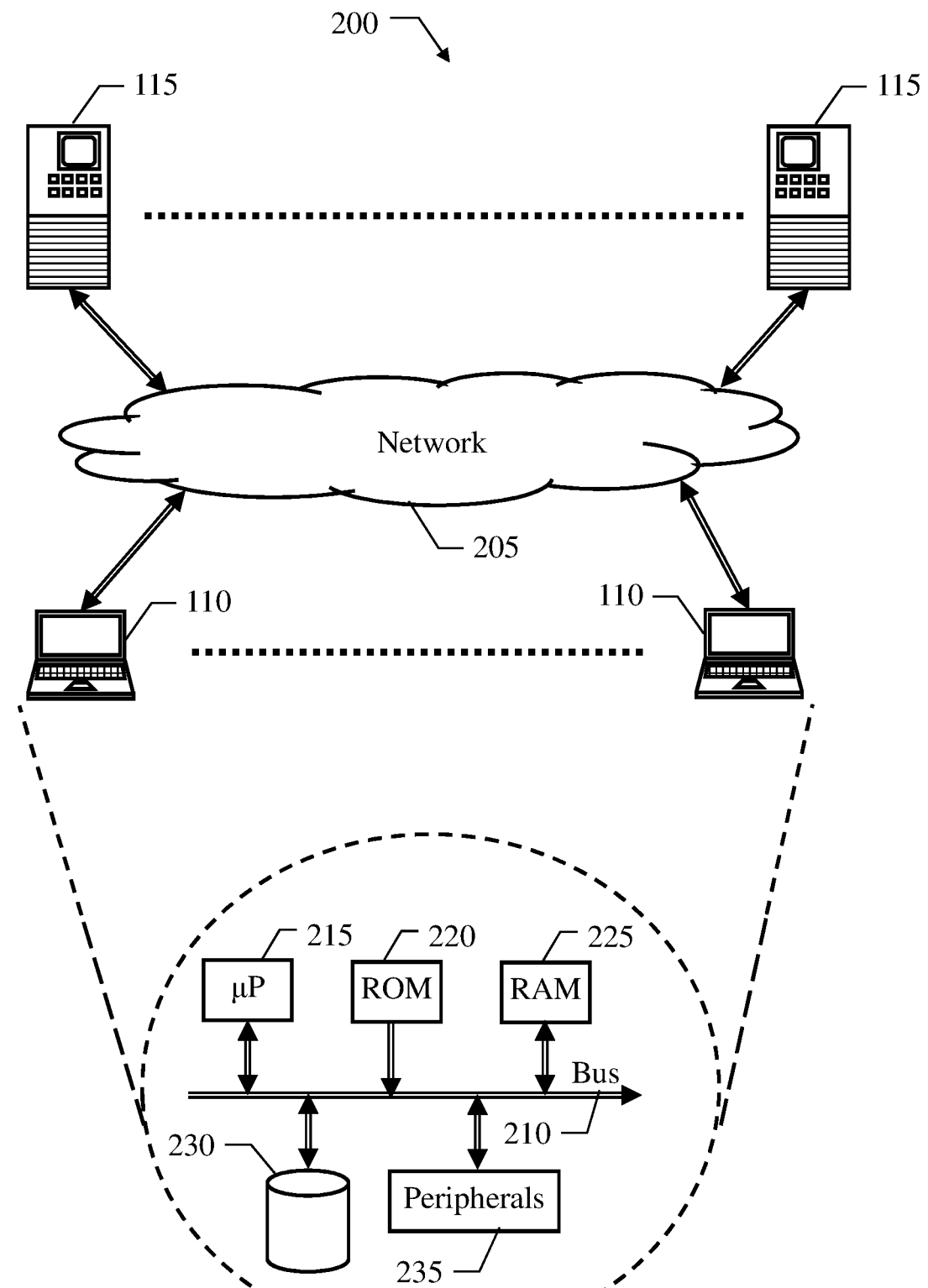
FIG. 2 shows a schematic block diagram of an information technology infrastructure wherein the solution according to an embodiment of the present disclosure may be practiced.

With reference now to FIG. 2, a schematic block diagram is shown of an information technology infrastructure 200 wherein the solution according to an embodiment of the present disclosure may be practiced.

The information technology infrastructure 200 comprises any number of the above-mentioned clients 110 and servers, generically denoted with the reference 115 (called computers 110-115 as a whole). The computers 110-115 communicate over a (telecommunication) network 205. For example, the information technology infrastructure 200 is based on the Internet. In this case, the servers 115 are web servers which are connected one to another through the network 205 being of global type; the clients 110 access the Internet (through corresponding access providers, not shown in the figure), in order to exploit the services offered by the servers 115. For example, the servers 115 allow accessing corresponding web sites providing banking, insurance, booking, social, travel and so on services.

Each of the computers 110-115 comprises several units which are connected among them through a bus structure 210 with one or more levels (with an architecture that is suitably scaled according to the type of the computer 110-115). Particularly, one or more microprocessors (µP) 215 control operation of the computer 110-115; a non-volatile memory (ROM) 220 stores basic code for a bootstrap of the computer 110-115 and a volatile memory (RAM) 225 is used as a working memory by the microprocessors 215. The computer 110-115 is provided with a mass-memory 230 for storing programs and data (for example, hard disks for the clients 110 and storage devices of corresponding data centers wherein the servers 115 are implemented). Moreover, the computer 110-115 comprises a number of controllers for peripherals, or Input/Output (I/O) units, 235; for example, the peripherals 235 of each client 110 comprise a keyboard, a mouse, a monitor, a network adapter (NIC) for connecting to the network 205 and a drive for reading/writing removable storage units (such as optical disks like DVDs), whereas the peripherals 235 of each server 115 comprise a network card for plugging the server 115 into the corresponding data center and then connecting it to a console of the data center (for example, a personal computer, also provided with a drive for reading/writing removable storage units as above) and to a switch/router sub-system of the data center (for its communication with the network 205).

Figure 3:
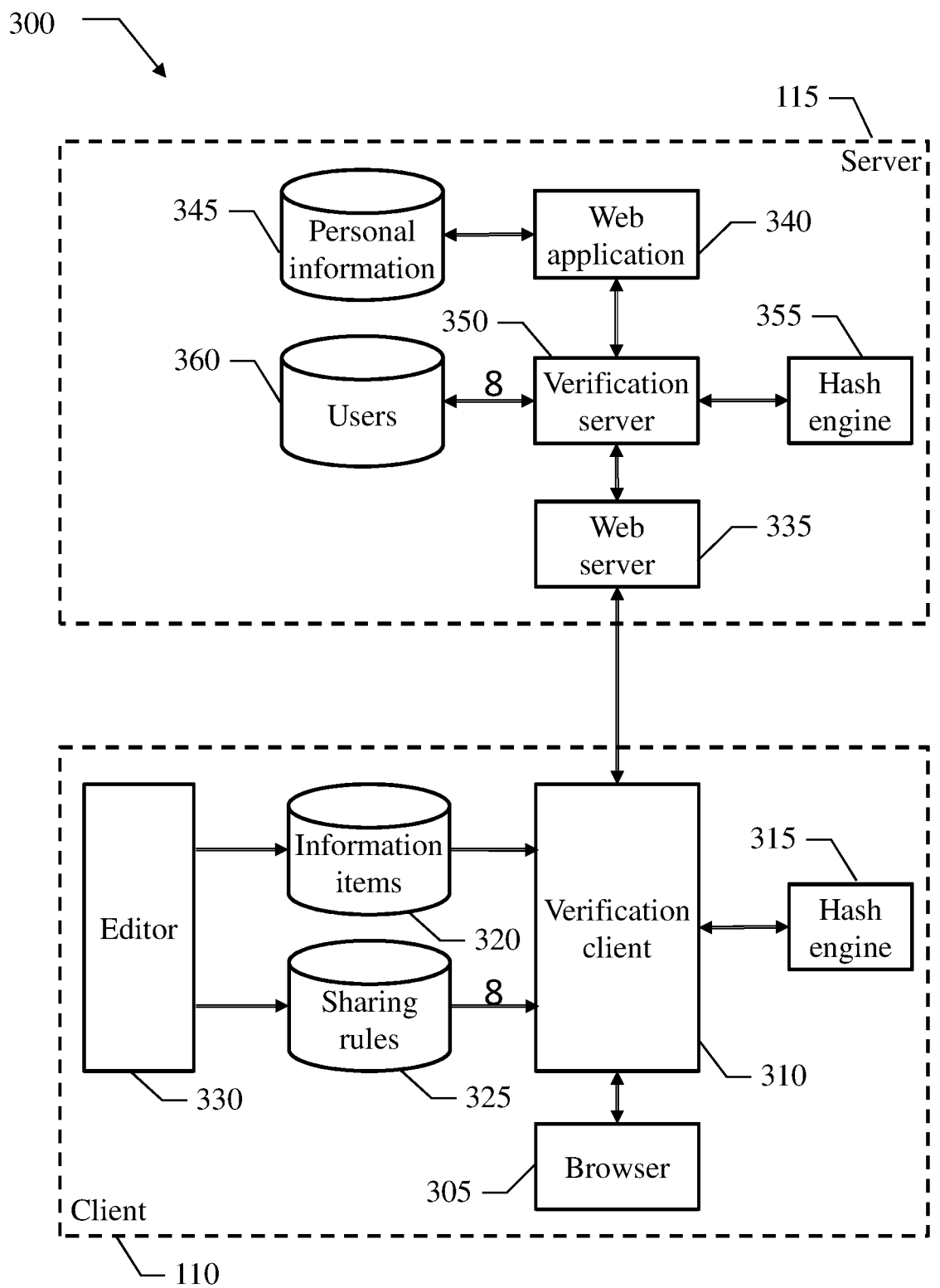
FIG. 3 shows the main software components that may be used to implement the solution according to an embodiment of the present disclosure.
Figure 4A:
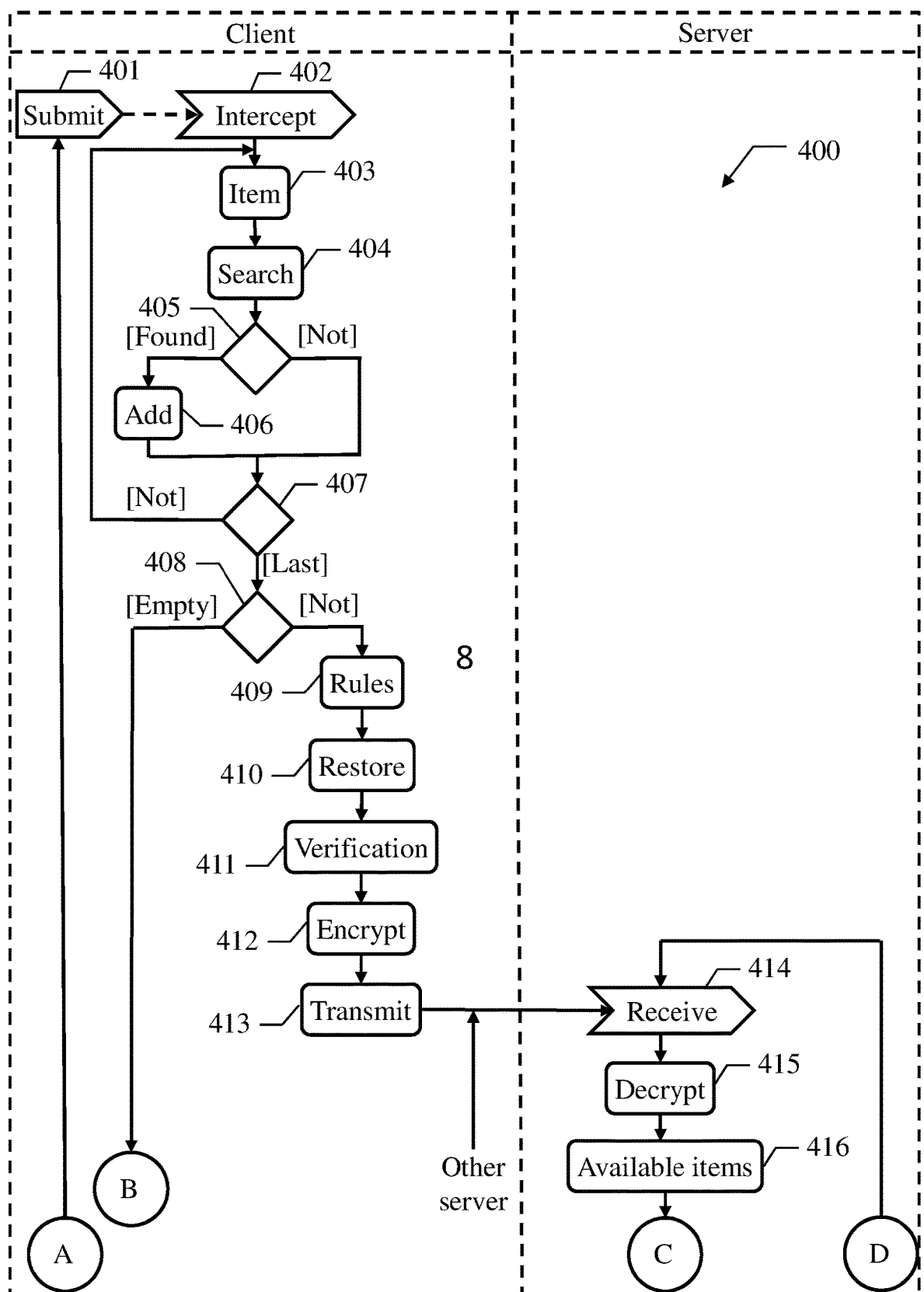
FIGS. 4A, 4B, 4C, and 4D show an activity diagram describing the flow of activities relating to an implementation of the solution according to an embodiment of the present disclosure.
Figure 4B:
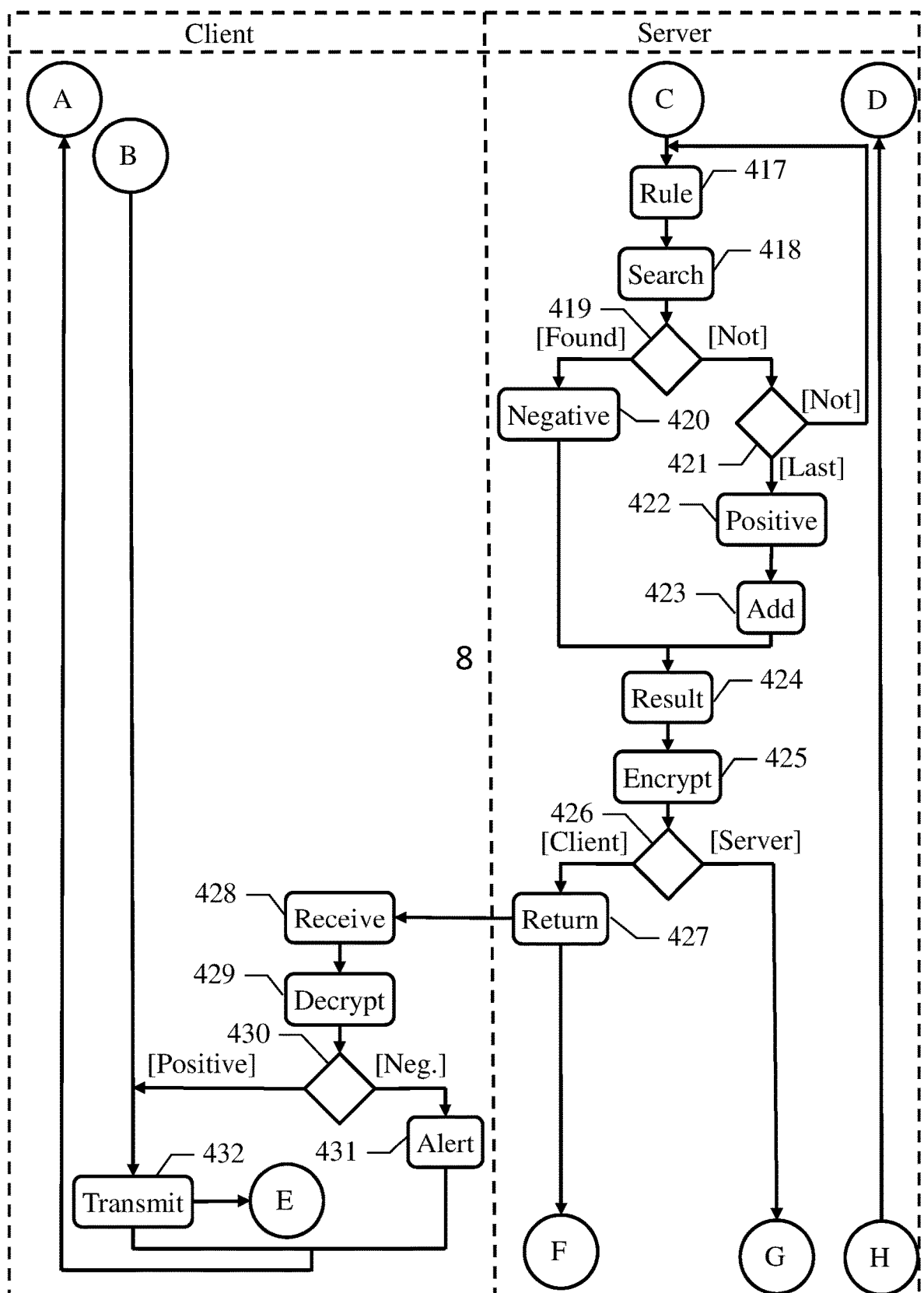
Figure 4C:
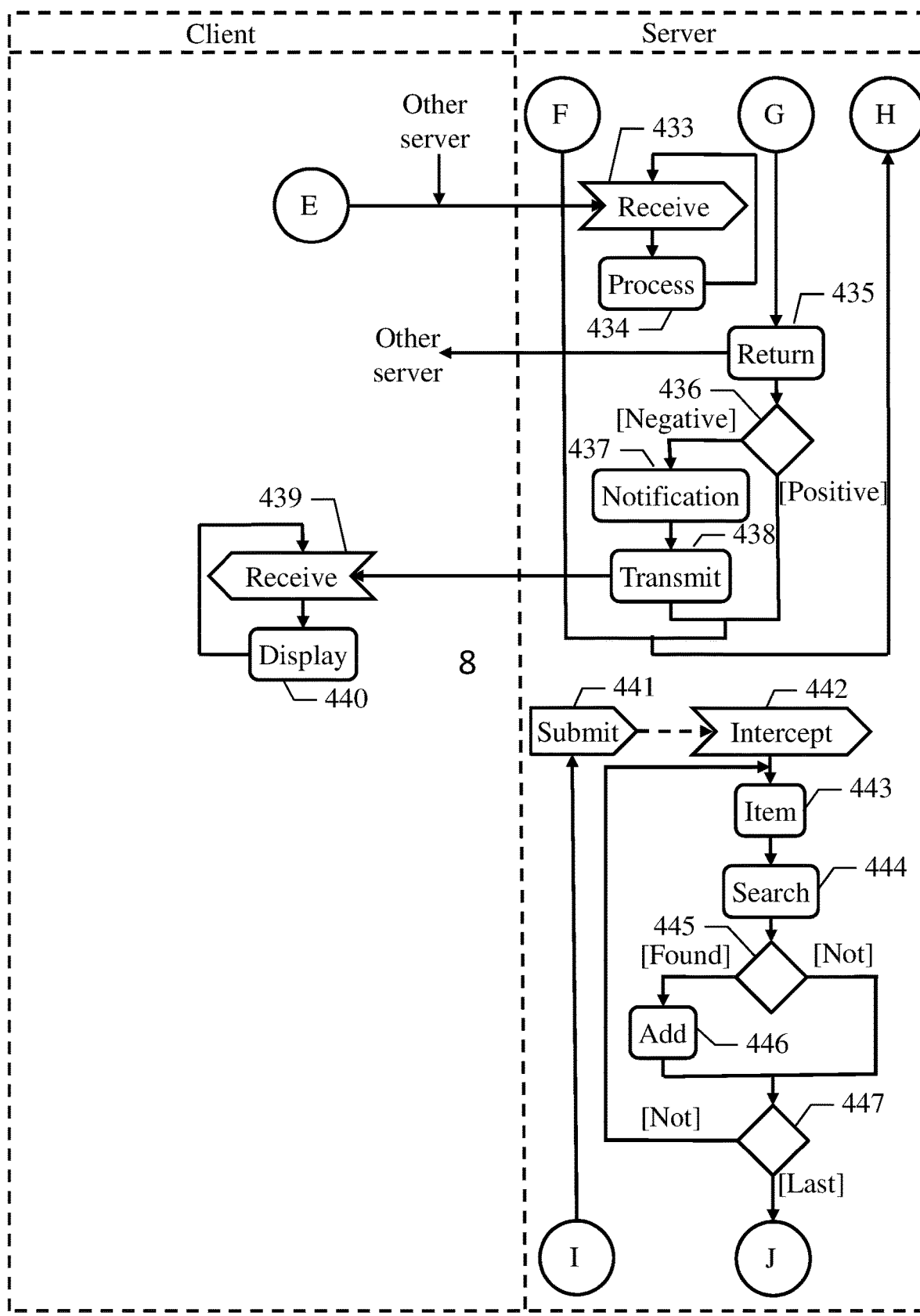
Figure 4D:
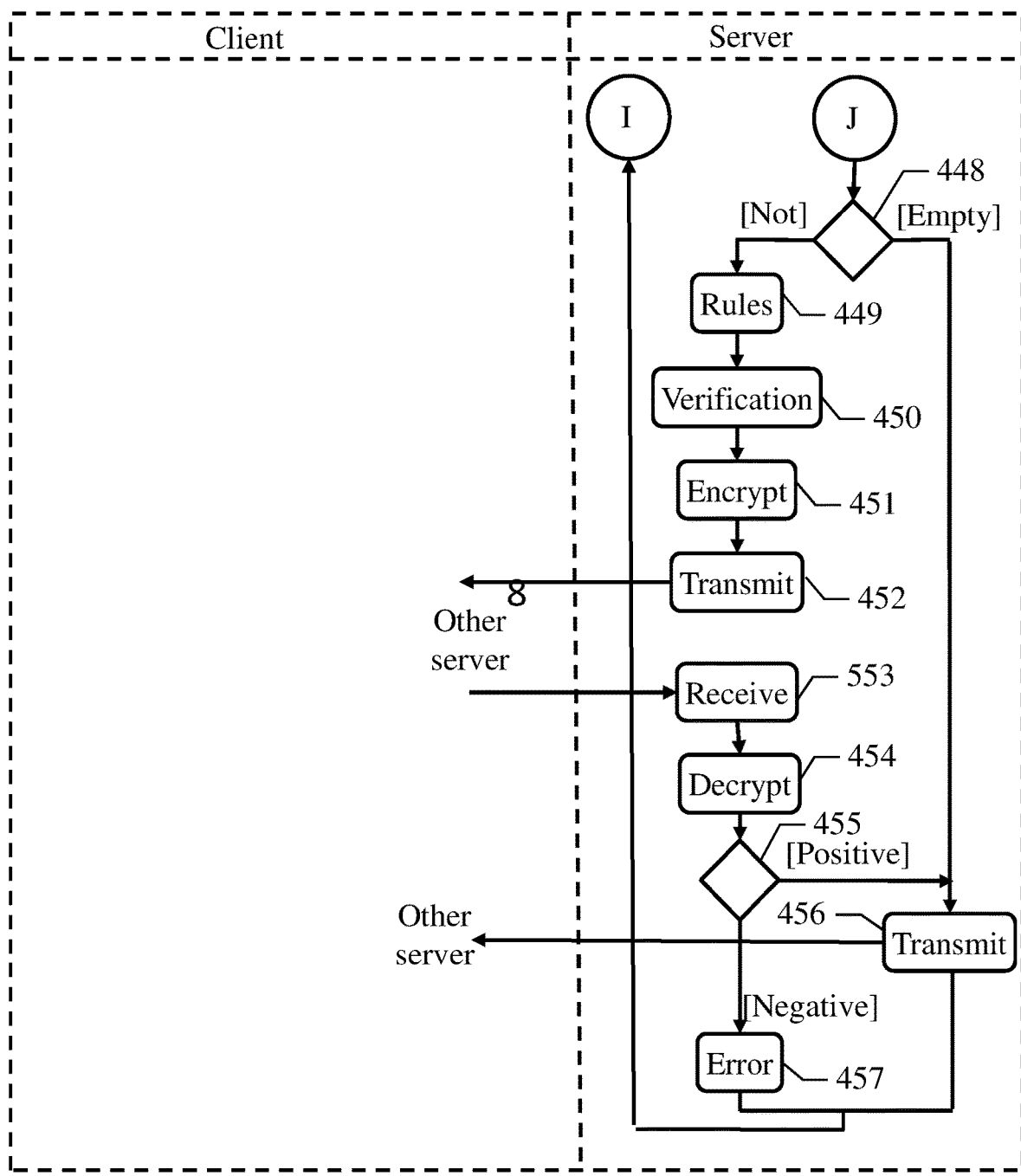

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memories and loaded (at least in part) into the working memories of the computers 110-115 when the programs are running. The programs are initially installed into the mass memories, for example, from removable storage units or from the network (not shown in the figure). In this respect, each program may be a module, segment or portion of code, which comprises one or more executable instructions for implementing the specified logical function.

Starting from each of the clients 110 (only one shown in the figure), it comprises the following components. A browser 305 is used to surf the Internet; as far as relevant to the present disclosure, the browser 305 is used to access the servers 115 for exploiting the corresponding services. In the solution according to an embodiment of the present disclosure, a verification client 310 controls the submission of personal information of the user of the client 110 (not shown in the figure) to the servers 115. For this purpose, the verification client 310 interacts with the browser 305 (for example, implemented as a corresponding plug-in) for intercepting the communications with the servers 115. The verification client 310 exploits a hash engine 315. The hash engine 315 is used to map input values of any arbitrary size onto hash values of fixed size (with a low risk of obtaining the same hash value from different input values). For this purpose, the hash engine 315 applies a hash function; the hash function is a deterministic function (i.e., always producing the same hash value for the same input value) of one-way type (i.e., practically infeasible to invert). The verification client 310 accesses (in read mode) an information item repository 320 defining the information items and a sharing rule repository 325 defining the sharing rules of the user; the information item repository 320 and the sharing rule repository 325 are synchronized among all the clients 110 of the user, for example, accessed by a corresponding pair of user identifier and password. The information item repository 320 stores one or more entries for corresponding information items defining the personal information of the user. Each entry comprises an (information) identifier of the information item (for example, its type like "name", "town", "fiscal code", "telephone number", "e-mail address", "credit card number" and so on) and the hash value of the information item. The sharing rule repository 325 stores one or more entries for corresponding sharing rules of the user. Each entry defines the sharing rule in terms of the information identifiers (for example, listing the information identifiers of two or more information items whose combination is not allowed (for example, NOT "name"+"town"). An editor 330 is available to the user for editing the information items and the sharing rules. The editor 330 accesses (in read/write mode) the information item repository 320 and the sharing rule repository 325.

Moving to each server 115 (only one shown in the figure), it comprises the following components. A web server 335 manages any communication with the server 115, particularly, by processing any request submitted thereto by the browser 305 of the clients 110. A web application 340 implements the service offered by the server 115. The web application 340 accesses (in read/write mode) a personal information repository 345 for the personal information which has been submitted to the server 115 by all its users authorizing the corresponding use. The personal information repository 345 stores an entry for each user. The entry comprises the user identifier, the information items of the corresponding personal information and an indication of the authorization which has been granted by the user to the third party associated with the server 115 for using the personal information (with or without the possibility of sharing the personal information with other third parties). In the solution according to an embodiment of the present disclosure, a verification server 350 controls the receipt of the personal information submitted to the server 115 by the clients 110 or by other servers 115. For this purpose, the verification server 350 is trusted by the verification client 310 of the clients 110 and the by verification server 350 of the other servers 115. This means that the verification server 350 may be relied upon to enforce the required control of the receipt of the personal information. For example, this result is guaranteed by a distributor of a corresponding software solution; particularly, the distributor ensures authenticity and integrity of the verification server 350 by means of a corresponding digital signature based on a pair of public/private keys and a digital certificate in a Public Key Infrastructure (PKI). The verification server 350 is interposed between the web server 335 and the web application 340 for intercepting their communications. The verification server 350 exploits a hash engine 355 (the same as above). The verification server 350 accesses (in read mode) a user repository 360 for the users of the server. The user repository 360 stores an entry for each user. The entry comprises the user identifier, the hash values of the (available) information items of the user which are stored in the corresponding repository 345 and the sharing rules relating to these available information items.

With reference now to FIG. 4A-FIG. 4D, an activity diagram is shown describing the flow of activities relating to an implementation of the solution according to an embodiment of the present disclosure.

Particularly, the activity diagram represents an exemplary process that may be used to control the distribution of personal information with a method 400. In this respect, each block may correspond to one or more executable instructions for implementing the specified logical function on the above-mentioned computers.

Starting from the swim-lane of a generic client, the process enters block 401 whenever its user submits any information to a generic server via the browser. For example, the user has accessed the server to download a web page therefrom. The web page defines an (on-line) form comprising one or more input fields for entering input information. The user fills in the form with the required input information and then clicks a submit button. In response thereto, the browser transmits a corresponding submission command to the server (comprising the input information). In the solution according to an embodiment of the present disclosure, the verification client at block 402 intercepts the submission command (for example, with hooking techniques). A loop is then entered for analyzing the input information contained in the submission command. The loop beings at block 403, wherein the verification client takes the information identifier and the hash value of a (current) information item in the corresponding repository into account (starting from a first one in any arbitrary order). The verification client at block 404 searches the hash value in the input information. For this purpose, the verification client commands the hash engine to calculate the hash value of each piece of the input information, for example, being entered into a corresponding input field (with this operation that is performed only once at the beginning of the loop); the verification client then verifies whether the hash value of the information item matches any of the hash values of the input information. The flow of activity branches at block 405 according to a result of this search. If the hash value is found in the input information, meaning that it contains the information item, the verification client at block 406 adds the hash value and the information identifier to an information item list (initially empty), which indicates the personal information of the user which is to be submitted to the server. The process then descends into block 407. The same point is also reached directly from the block 405 if the hash value is not found in the input information, meaning that it does not contain the corresponding information item. At this point, the verification client verifies whether a last information item has been processed. If not, the flow of activity returns to the block 403 to repeat the same operations on a next information item. Conversely (once all the information items have been processed), the loop is exit by descending to block 408.

The flow of activity now branches according to a content of the information item list. If the information item list is not empty, meaning that the input information contains personal information of the user, the verification client at block 409 retrieves any (relevant) sharing rules from the corresponding repository relating to the (new) information items to be submitted to the server. Particularly, the relevant sharing rules are the ones that contain at least one of the information identifiers of the information item list. The verification client at block 410 restores each of the relevant sharing rules by replacing its information identifiers with the corresponding hash values (retrieved from the information item list). The verification client at block 411 builds a corresponding verification packet, by adding the user identifier (for example, retrieved from a configuration parameter), the hash values of the new information items (in the information item list) and the relevant sharing rules. The verification client at block 412 encrypts the verification packet with the public key of the verification server of the server (for example, retrieved from the distributor of the software solution). The verification client at block 413 transmits the (encrypted) verification packet to the server (possibly after verifying the authenticity and integrity of the verification server).

Moving to the swim-lane of the server, the verification server receives the verification packet from the client at block 414; the same point is also be reached when the verification server receives a similar verification packet from another server (as described in the following). The verification server at block 415 decrypts the verification packet with its private key (and it extracts the user identifier, the hash values of the new information items and the relevant sharing rules). The encryption of the verification packet allows ensuring that the verification packet may be processed by the verification server only (and particularly not by the web application for which the submission of the new information items is to be controlled). The verification server at block 416 retrieves the hash values of the available information items of the user (from the corresponding repository). A loop is then entered for verifying the compliance of the combination of the new/available information items with the relevant sharing rules. The loop beings at block 417, wherein the verification server takes a (current) relevant sharing rule into account (starting from a first one in any arbitrary order). The verification server at block 418 searches the hash values of the relevant sharing rule in the new/available information items. The flow of activity branches at block 419 according to a result of this search. If all the hash values of the relevant sharing rule are found in the new/available information items (meaning that the combination of the new/available information items is not allowed), the loop is exit by descending into block 420 wherein the verification server sets a verification result (of the verification of the compliance with the sharing rules) to negative. Conversely, if one or more hash values of the relevant sharing rule are not found in the new/available information items, the process descends into block 421 wherein the verification server verifies whether a last relevant sharing rule has been processed. If not, the flow of activity returns to the block 417 to repeat the same operations on a next relevant sharing rule. Conversely (once all the relevant sharing rules have been processed), the loop is exit by descending into block 422 wherein the verification server sets the verification result to positive (since the combination of the new/available information items is allowed). Moreover, the verification server at block 423 adds the hash values of the new information items and the relevant sharing rules to the entry of the user in the corresponding repository; this operation may be performed either indiscriminately (simpler implementation) or only when the user has authorized the third party associated with the server to share the new information items, as detected by the verification client and notified in a corresponding flag added to the verification packet (lower storage usage). The use of the hash values allows the verification server to verify the compliance of the combination of the new/available information items with the relevant sharing rule without providing the actual new information items to the server. The flow of activity then continues from the block 420 or the block 423 to block 424. At this point, the verification server builds a result packet. The result packet contains the verification result; moreover, when the verification result is negative, the result packet may also contain non-compliance information indicating why the combination of the new/available information items is not allowed (for example, the (non-compliant) relevant sharing rule whose hash values are all comprised in the hash values of the new/available information items). The verification server at block 425 encrypts the result packet with its private key. The flow of activity branches at block 426 according to a source of the verification packet. If the verification packet has been received from a client, the verification server at block 427 returns the (encrypted) result packet to the client. The process then goes back to the block 414 waiting for a next verification packet from any client/server.

Referring again to the swim-lane of the client, the verification client at block 428 receives the result packet from the server (being in a waiting condition for it). The verification client at block 429 decrypts the result packet, by using the public key of the verification server (and extracts the verification result and the possible non-compliance information). The encryption of the result packet allows ensuring that the verification result has been actually provided by the (trusted) verification server. The flow of activity branches at block 430 according to the verification result. If the verification result is negative, the verification client at block 431 displays a corresponding alert on the monitor of the client. For example, the verification client determines the hash values in the non-compliant sharing rule different from the hash values in the information item list (of the available information items of the server) and retrieves their information identifiers (from the corresponding repository); the alert then indicates that the combination of the new information items (indicated by their information identifiers from the information item list) with the available information items (indicated by their information identifiers so determined) is not allowed on the server. Conversely, if the verification result is positive, the process passes from the block 430 to block 432; the same point is also reached directly from the block 408 if the information item list is empty, meaning that the input information does not contain personal information of the user. In both cases, the verification client transmits the submission command (containing either personal information which may be submitted to the server or no personal information) to the server as usual. The process then returns from the block 431 or the block 432 to the block 401 waiting for a next submission of information to any server.

Moving to the swim-lane of the server, the web server at block 433 receives the submission command from the client; the same point is also reached when the server receives a similar submission command from another server (as described in the following). The web server passes the submission command to the web application, which processes it at block 434 as usual. Particularly, if the submission command contains personal information of the user (with acceptance of corresponding privacy terms, provided at the same time or with another submission command), the web application updates the personal information repository accordingly. The process then returns to the block 433 waiting for a next submission command from any client/server.

Referring back to the block 426, if the verification packet has been received from another server, the verification server at block 435 returns the (encrypted) result packet to the other server (described in the following). The flow of activity branches at block 436 according to the verification result. If the verification result is negative, the verification server at block 437 builds a notification packet for the client. The notification packet comprises corresponding identifiers of the (target) server and of the other (source) server (for example, their domain names) and the same non-compliance information as above. The verification server at block 437 transmits the notification packet to the client (possibly encrypted with its private key). The process then goes back to the block 414 waiting for a next verification packet from any client/server.

Referring again to the swim-lane of the client, the verification client at block 439 receives the notification packet from the server (and extracts the identifier of the source server, the identifier of the target server and the non-compliance information, after decrypting the notification packet if necessary). The verification client at block 440 displays a corresponding notification on the monitor of the client. For example, the verification client retrieves the information identifiers of the hash values in the non-compliant sharing rule (from the corresponding repository); the notification then indicates that the combination of the information items (indicated by their information identifiers) in not allowed from the source server to the target server. The process then returns to the block 439 waiting for a next notification packet from any server.

In a completely independent way, the process enters block 441 whenever the web application transmits a submission command (via the web server) to another (target) server containing (output) information to be submitted thereto. In the solution according to an embodiment of the present disclosure, the verification server at block 442 intercepts the submission command (for example, with hooking techniques). As above, a loop is then entered for analyzing the output information contained in the submission command. The loop beings at block 443, wherein the verification server takes the hash value of a (current) information item in the entry of a (current) user in the corresponding repository into account (starting from a first one in any arbitrary order). The verification server at block 444 searches the hash value in the output information as above, by calculating the hash value of each piece of the output information, for example, being provided in a corresponding parameter (with this operation that is performed only once at the beginning of the loop) and verifying whether the hash value of the information item matches any of the hash values of the output information. The flow of activity branches at block 446 according to a result of this search. If the hash value is found in the output information, meaning that it contain the corresponding information item, the verification server at block 445 adds the user identifier and the hash value to an information item list (initially empty), which indicates the personal information of the users which is to be submitted to the target server. The process then descends into block 447. The same point is also reached from the block 445 if the hash value is not found in the output information, meaning that it does not contain the corresponding information item. At this point, the verification server verifies whether a last information item of a last user has been processed. If not, the flow of activity returns to the block 443 to repeat the same operations on a next information item (of the same user or of a next user). Conversely (once all the information items of all the users have been processed), the loop is exit by descending to block 448.

The flow of activity now branches according to a content of the information item list. If the information item list is not empty, meaning that the output information contains personal information of one or more users, the verification server at block 449 retrieves any (relevant) sharing rules from the corresponding repository relating to the (new) information items to be submitted to the target server. Particularly, the relevant sharing rules are the ones of each user identifier of the information item list that contain at least one of the hash values of the same user in the information item list. The verification server at block 450 builds a corresponding verification packet, by adding the user identifiers of the information item list and, for each of them, the corresponding hash values of the information item list and the relevant sharing rules. The verification server at block 451 encrypts the verification packet with the public key of the verification server of the target server. The verification server at block 452 transmits the (encrypted) verification packet to the target server (possibly after verifying the authenticity and integrity of its verification server), for its processing as described above.

The verification server at block 453 receives the corresponding result packet from the target server (being in a waiting condition for it). As above, the verification server at block 454 decrypts the result packet by using the public key of the verification server of the target server (and extracts the verification result and the possible non-compliance information). The flow of activity branches at block 455 according to the verification result. If the verification result is negative, the verification server at block 456 enters an error condition (possibly sending a corresponding alert, for example, via e-mail to an administrator of the server). Conversely, if the verification result is positive, the process continues to block 457; the same point is also reached directly from the block 448 if the information item list is empty, meaning that the output information does not contain personal information of any user. In both cases, the verification server transmits the submission command (containing either personal information which may be shared with the target server or no personal information) to the target server as usual. The process then returns from the block 456 or the block 457 to the block 441 waiting for a next submission command from the web application.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, the terms "substantially", "about", "approximately" and the like should be understood as "within 10%". Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling distribution of a plurality of information items of a subject. However, the information items may be in any number and of any type (for example, personal information, sensitive information, commercial and/or technical information, and so on), in any form (for example, texts, audios, images, videos and so on) and they may pertain to any subject (for example, a person, a company, an organization and so on).

In an embodiment, the method comprises the following steps executed by a target computing system. However, the target computing system may be of any type (see below).

In an embodiment, the method comprises receiving (by the target computing system) an indication of new one or more of the information items. However, the new information items may be in any number, they may be indicated in any way (for example, by their hash values, by their information identifiers or even directly by the information items themselves) and they may be received in any way (for example, alone or with the sharing rules, in encrypted or clear form, and so on).

In an embodiment, the new information items are to be submitted to a target entity associated with the target computing system. However, the target entity may be of any type (for example, a company, an organization and so on) and it may be associated with the target computing system in any way (for example, with the target computing system belonging to the organization and running a software module dedicated to control the distribution of the information items, with the target computing system separate from the organization and dedicated as a whole to control the distribution of the information items, and so on).

In an embodiment, the method comprises receiving (by the target computing system) one or more sharing rules of the subject. However, the sharing rules may be in any number and they may be received in any way (for example, alone or with the indication of the new information items, in encrypted or clear form, directly or downloaded in response to the indication of the new information items, and so on).

In an embodiment, the sharing rules are based on one or more combinations of the information items. However, the sharing rules may be based in any way on any number and type of combinations of the information items (for example, indicating that the combination of two or more information items, indicated in any way such as by their hash values, information identifiers, actual values and the like, is not allowed in general, only on specific target computing systems, such as having one or more characteristics, only in specific situations, such as time, location and the like, and so on).

In an embodiment, the method comprises retrieving (by the target computing system) an indication of any available ones of the information items which are available to the target computing system. However, the available information items may be retrieved in any way (for example, directly from a dedicated memory structure, indirectly from a generic memory structure storing the personal information via other software applications, locally or remotely, and so on) and they may be indicated in any way (either the same or different with respect to the new information items).

In an embodiment, the method comprises verifying (by the target computing system) a compliance of a combination of the new information items and the available information items with the sharing rules. However, the compliance may be verified in any way (for example, by matching hash values, information identifiers, actual values of the information items and so on).

In an embodiment, the method comprises controlling (by the target computing system) a receipt of the new information items according to a result of said verifying the compliance. However, the receipt of the new information items may be controlled in any way according to the result of the compliance verification (for example, in case of positive result by accepting the new information items in any way, such as directly or forwarding them, in case of negative result by refusing the new information items or requiring a confirmation to the subject for their acceptance, and so on).

In an embodiment, said receiving the indication of the new information items, receiving the sharing rules, retrieving the indication of the available information items, verifying the compliance and controlling the receipt of the new information items are performed by a trusted entity of the target computing system. However, the trusted entity may be of any type (for example, a software module running on the target computing system, the whole target computing system and so on).

In an embodiment, the trusted entity is trusted by a source computing system of the subject. However, the trusted entity may be trusted in any way (for example, by means of a digital certificate, a secure communication tunnel, and so on) by any source computing system (see below).

In an embodiment, the method comprises controlling (by the target computing system) a forwarding of the new information items to the target entity according to a result of said verifying the compliance. However, the forwarding may be of any type (for example, to a software module running on the same target computing system, to another computing system and so on) and controlled according to the result of the verification in any way (for example, enabling the transfer, preventing the transfer, requiring a confirmation to the subject for enabling the transfer and so on).

In an embodiment, the method comprises accepting (by the target computing system) the receipt of the new information items in response to a positive result of said verifying the compliance. However, the receipt of the new information items may be accepted in any way (for example, enabling its actual transmission, receiving it directly and so on).

In an embodiment, the method comprises refusing (by the target computing system) the receipt of the new information items in response to a negative result of said verifying the compliance. However, the receipt of the new information items may be refused in any way (for example, preventing its actual transmission, disregarding it, with or without any notification to the computing system from which the indication of the new information items has been received and/or to the source computing system of the subject, and so on).

In an embodiment, the method comprises notifying (by the target computing system) said refusing the receipt of the new information items to a source computing system of the subject. However, the notification may be of any type (for example, simply indicating the refusal, with the addition of any non-compliance information, such as the first non-compliant sharing rule one or all the non-compliant sharing rules, and so on) and it may be used in any way (for example, to output any corresponding notification, such as a visual message, a vocal message and the like, by sending an instant message, an e-mail and the like, any combination thereof, and so on).

In an embodiment, the method comprises receiving (by the target computing system) the indication of the new information items in association with the sharing rules. However, this information may be received in any way (for example, in a single message or in two or more messages being linked together, with each message in the form of a verification packet, a remote command, and so on).

In an embodiment, the method comprises receiving (by the target computing system) the indication of the new information items from a further target computing system to which the new information items have been submitted by a source computing system of the subject. However, the indication of the new information items may be received in any way from the further target computing system (either the same or different with respect to when it is received from the source computing system directly).

In an embodiment, the method comprises storing (by the target computing system) the sharing rules in response to the receipt of the new information items. However, the sharing rules may be stored in any way (for example, in a database, a file and so on) in response to the receipt of the new information items (for example, indiscriminately, only when the new information items may be shared and so on).

In an embodiment, the method comprises transmitting (by the target computing system) the indication of the new information items in association with the sharing rules to a further target computing system to which the new information items are to be submitted. However, this information may be transmitted in any way (either the same or different with respect to its receipt as indicated above).

In an embodiment, the method comprises receiving (by the target computing system) the indication of the new information items in association with an identifier of the subject. However, the identifier of the subject may be of any type (for example, a userID, an e-mail address, an identifier of the source computing system and so on) and it may be associated with the indication of the new information items in any way (for example, specified in the same message or in a separate message linked to the one used to receive the indication of the new information items, recovered from the message used to receive the indication of the new information items, such as from a source address thereof, and so on).

In an embodiment, the method comprises retrieving (by the target computing system) the indication of the available information items associated with the identifier of the subject. However, the available information items associated with the identifier of the subject may be retrieved in any way (for example, by querying a common memory structure, by reading a memory structure dedicated to the subject and so on).

In an embodiment, the method comprises storing (by the target computing system) the new information items in association with the identifier of the subject in response to the receipt thereof. However, the identifier of the subject may be associated with the new information items in any way (for example, by writing the identifier of the subject into a corresponding record of a common memory structure, by writing the new information items into a memory structure dedicated to the subject, and so on).

In an embodiment, the method comprises receiving (by the target computing system) a verification packet comprising the indication of the new information items and/or the sharing rules in encrypted form. However, the verification packet may be of any type (for example, a message, a command with the indication of the new information items only, the sharing rules only or both of them, with or without additional information, and so on) and it may be encrypted in any way (for example, with a public key or a secret key of the trusted entity, of the target computing system and so on).

In an embodiment, the method comprises decrypting (by the target computing system) the verification packet. However, the verification packet may be descripted in any way (for example, with a corresponding private key, with the same secret key, with the private/secret key that is known to the trusted entity but not to the target entity, and so on).

In an embodiment, the method comprises receiving (by the target computing system) the indication of the new information items comprising corresponding hash values of the new information items. However, the hash values may be of any type (for example, based on cryptographic hashing, tabulation hashing, universal hashing, rolling hashing and so on).

In an embodiment, the method comprises receiving (by the target computing system) the sharing rules based on the combinations of corresponding hash values of the information items. However, the sharing rules may be based on the hash values of the information items in any way (for example, directly by containing the hash values, indirectly by containing information identifiers used to retrieve the hash values, and so on).

In an embodiment, the method comprises retrieving (by the target computing system) the indication of the available information comprising corresponding hash values of the available information items. However, the hash values of the available information items may be retrieved in any way (for example, by reading them from a dedicated memory structure, by calculating them from the information available to the target computing system and so on).

In an embodiment, the information items are personal information of a person. However, the personal information may be of any type (for example, any piece of information that may be used to distinguish or trace the person, such as name, social security number, date and place of birth, photos, biometric records, any piece of information which may be linked to the person, such as medical, educational, financial or employment conditions, client's network addresses, social accounts, and so on).

A further embodiment provides a method for controlling distribution of a plurality of information items of a subject, wherein the method comprises: transmitting, by a source computing system of the subject, an indication of new one or more of the information items to a target computing system associated with a target entity to which the new information items are to be submitted, transmitting, by the source computing system, one or more sharing rules of the subject to the target computing system, the sharing rules being based on one or more combinations of the information items, receiving, by the source computing system, a result of a verification of a compliance, of a combination of the new information items and any available ones of the information items being available to the target computing system, with the sharing rules from the target computing system, and controlling, by the source computing system, a transmission of the new information items to the target computing system according to a result of the verification. The same considerations pointed out above apply to this embodiment as well.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program which is configured for causing a computing system to perform each of the above-mentioned methods. An embodiment provides a computer program product for controlling distribution of a plurality of information items of a subject. The computer program product comprises a computer readable storage medium that has program instructions embodied therewith. The program instructions are executable by a computing system to cause the computing system to perform each of the above-mentioned methods. However, the computer program may be implemented as a stand-alone module, as a plug-in for a pre-existing software program (for example, the web server for the target computing system or the browser for the source computing system) or directly therein. Moreover, the computer program may be executed on any target/source computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a computing system comprising means that are configured for performing the steps of each of the above-described methods. An embodiment provides a computing system comprising a circuit (i.e., any hardware suitably configured, for example, by software) for performing the steps of each of the same methods. However, the computing system may be of any type (for example, the target computing system, the source computing system, a combination of one or more source computing systems and one or more target computing systems, and so on). Moreover, the target computing system may be of any type (for example, a physical machine, a virtual machine, a cloud service, and so on), the source computing system may be of any type (for example, a desktop, a laptop, a tablet, a smartphone and so on) and they may communicate over any network (for example, a global network, a wide area network, a local area network and so on) using any kind of connections (for example, wired or wireless connections, telephone connections, satellite connections and so on).

Generally, similar considerations apply if the computing system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the person's computer, partly on the person's computer, as a stand-alone software package, partly on the person's computer and partly on a remote computer or entirely on the remote computer or server. In the latter scenario, the remote computer may be connected to the person's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for controlling distribution of a plurality of information items of a subject, wherein the method comprises:

receiving, by a target computing system, an indication of new information items to be submitted to a target entity associated with a target computing system, the indication including a hash function for each of the new information items, each of the hash functions producing a hash value for each of the new information items;

receiving, by the target computing system, one or more sharing rules of a subject of the new information items, the sharing rules being based on one or more combinations of the information items;

retrieving, by the target computing system, an indication of any available items already available to the target computing system which are the same as the new information items;

verifying, by the target computing system, a compliance of a combination of the new information items and the available information items with the sharing rules; and controlling, by the target computing system, a receipt of the new information items according to a result of the verifying of the compliance.

2. The method according to claim 1, wherein said receiving the indication of the new information items, receiving the sharing rules, retrieving the indication of the available information items, verifying the compliance and controlling the receipt of the new information items are performed by a trusted entity of the target computing system being trusted by a source computing system of the subject.

3. The method according to claim 1, wherein, the method comprises:
controlling, by the target computing system, a forwarding of the new information items to the target entity according to a result of said verifying the compliance.

4. The method according to claim 1, wherein the method comprises:
accepting, by the target computing system, the receipt of the new information items in response to a positive result of said verifying the compliance.

5. The method according to claim 1, wherein the method comprises:
refusing, by the target computing system, the receipt of the new information items in response to a negative result of said verifying the compliance.

6. The method according to claim 5, wherein the method comprises:
notifying, by the target computing system, said refusing the receipt of the new information items to a source computing system of the subject.

7. The method according to claim 1, wherein the method comprises:
receiving, by the target computing system, the indication of the new information items in association with the sharing rules.

8. The method according to claim 1, wherein the method comprises:
receiving, by the target computing system, the indication of the new information items from a further target computing system to which the new information items have been submitted by a source computing system of the subject.

9. The method according to claim 1, wherein the method comprises:
storing, by the target computing system, the sharing rules in response to the receipt of the new information items, and
transmitting, by the target computing system, the indication of the new information items in association with the sharing rules to a further target computing system to which the new information items are to be submitted.

10. The method according to claim 1, wherein the method comprises:
receiving, by the target computing system, the indication of the new information items in association with an identifier of the subject,
retrieving, by the target computing system, the indication of the available information items associated with the identifier of the subject, and
storing, by the target computing system, the new information items in association with the identifier of the subject in response to the receipt thereof.

11. The method according to claim 1, wherein the method comprises:
receiving, by the target computing system, a verification packet comprising the indication of the new information items and/or the sharing rules in encrypted form, and
decrypting, by the target computing system, the verification packet.

12. The method according to claim 1, wherein the method comprises:
receiving, by the target computing system, the indication of the new information items comprising corresponding hash values of the new information items,
receiving, by the target computing system, the sharing rules based on the combinations of corresponding hash values of the information items, and
retrieving, by the target computing system, the indication of the available information comprising corresponding hash values of the available information items.

13. The method according to claim 1, wherein the information items are personal information of a person.

14. A computer program product for controlling distribution of a plurality of information items of a subject, the computer program product comprising a computer readable storage medium having program instructions embodied therewith, the program instructions readable by a computing system to cause the computing system to perform a method comprising:
receiving an indication of new information items to be submitted to a target entity associated with the computing system, the indication including a hash function for each of the new information items, each of the hash functions producing a hash value for each of the new information items;
receiving one or more sharing rules of a subject of the new information items, the sharing rules being based on one or more combinations of the information items;
retrieving an indication of any available items already available to the target computing system which are the same as the new information items;
verifying a compliance of a combination of the new information items and the available information items with the sharing rules; and
controlling a receipt of the new information items according to a result of said verifying the compliance.

15. A computing system for controlling distribution of a plurality of information items of a subject, the computing system comprising:
circuitry for receiving an indication of new information items to be submitted to a target entity associated with a computing system, the indication including a hash function for each of the new information items, each of the hash functions producing a hash value for each of the new information items;
circuitry for receiving one or more sharing rules of a subject of the new information items, the sharing rules being based on one or more combinations of the information items,
circuitry for retrieving an indication of any available items already available to the target computing system which are the same as the new information items;
circuitry for verifying a compliance of a combination of the new information items and the available information items with the sharing rules; and
circuitry for controlling a receipt of the new information items according to a result of said verifying the compliance.

* * * * *